June 7, 1955 P. J. H. JANSSEN 2,710,363
CIRCUIT FOR GENERATING A SAWTOOTH CURRENT IN A COIL
Filed Sept. 4, 1953
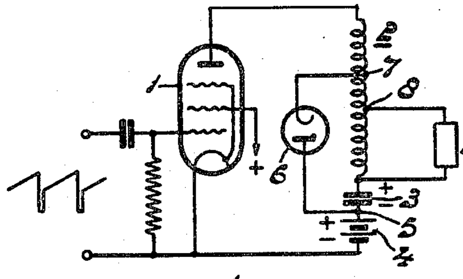
Fig. 1
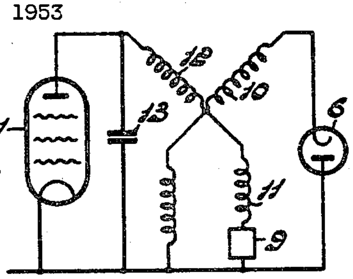
Fig. 2
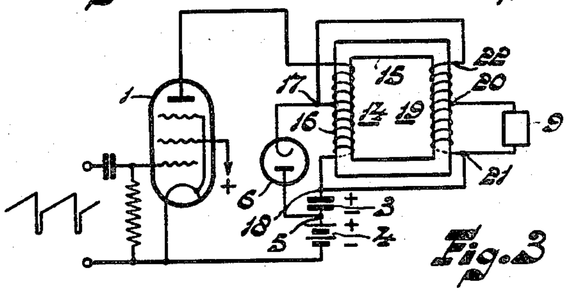
Fig. 3
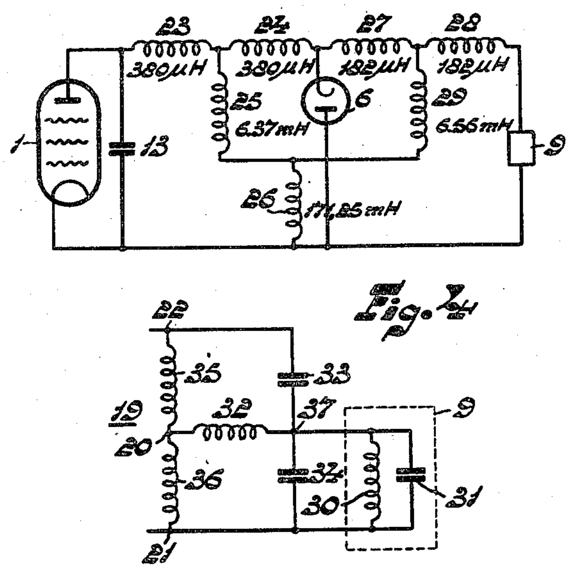
Fig. 4
Fig. 5
INVENTOR
PETER JOHANNES HUBERTUS JANSSEN
BY Fred M. Vogel
AGENT United States Patent Office 2,710,363
Patented June 7, 1955

2,710,363

CIRCUIT FOR GENERATING A SAWTOOTH CURRENT IN A COIL

Peter Johannes Hubertus Janssen, Eindhoven, Netherlands, assignor to Hartford National Bank and Trust Company, Hartford, Conn., as trustee Application September 4, 1953, Serial No. 378,600

3 Claims. (Cl. 315—27)

This invention relates to circuits for generating a sawtooth current in a coil with the use of a discharge tube and a series-booster diode circuit coupled by way of a transformer to an output circuit of the tube.

Circuits of this kind are known in different forms, all of which exhibit the disadvantage that, after the end of the fly-back of the sawtooth current, interfering oscillations occur in the current traversing the coil and this is frequently troublesome, more particularly if the coil forms part of the deflection system for the electron-ray beam of an image tube of a television receiver.

As will be explained more fully hereinafter, the said interfering oscillations are attributable to the swinging out of oscillatory circuits constituted by stray inductors and stray capacitors, which cannot be evoided even when the various parts of the conventional circuits are constructed with great care.

The present invention is based on recognition of the fact that the said oscillations may be considerably attenuated by a determined way of coupling the coil.

The circuit according to the invention is characterised in that the part of the transformer winding which has the series-booster diode circuit connected to it, is arranged in parallel with the primary winding of a second transformer, the secondary winding of which has connected to it the coil, said parallel-connected windings being provided on separate parts of a core which is common to the two transformers.

In order that the invention may be readily carried into effect, it will now be described with reference to the accompanying drawing showing, by way of example, one embodiment thereof.

Fig. 1 shows a circuit of known type and Fig. 2 shows the substitution diagram of the circuit shown in Fig. 1.

Fig 3 shows one embodiment of the circuit according to the invention, of which the substitution diagram is shown in Fig. 4, and Fig. 5 is a diagram which serves to explain a further step which may be taken in the circuit of Fig. 3.

In the circuit shown in Fig. 1, a sawtooth voltage is supplied in the usual manner to the control grid of a tube 1. The anode circuit thereof includes the series-combination of a coil 2, which is of the autotransformer type, a capacitor 3 and an anode supply battery 4. The junction 5 between the battery 4 and the capacitor 3 is connected to the anode of a diode 6, the cathode of which is coupled to a point 7 on the autotransformer 2.

A deflection coil 9 is included between a tapping 8 and the lower end of the autotransformer coil 2. As is well-known, a sawtooth current is generated in the deflection coil 9 and the diode 6 is conductive at least during the beginning of the stroke of the sawtooth current, whereby the capacitor 3 is charged with the polarity indicated in the drawing, thus assisting in the function of the battery 4 provided in the anode circuit of the tube 1.

Since a certain stray exists between the various winding parts of the autotransformer coil 2, an undesired oscillatory phenomenon occurs in the circuit of coil 9 at the end of the fly-back of the saw-tooth current and hence at the moment when the diode 6 is released.

Fig. 2 shows the substitution diagram of the circuit of Fig. 1 for use at alternating current.

At the end of the fly-back of the sawtooth current traversing coil 9, energy is still available in a coil 12, which represents the anode stray inductance. When the diode 6 becomes conducting, said energy produces current in the circuit which is substantially constituted by the inductor 12, an inductor 10, the diode 6 and a capacitor 13. Since the deflection coil is connected between the junction of the inductors 10, 12 and the anode of diode 6 and hence is parallel to part of the above-mentioned oscillatory circuit, the coil 9 is traversed by an undesired current.

In the embodiment of the circuit according to the invention as shown in Fig. 3, the anode circuit of the tube 1 includes, as before, a coil 14 of the autotransformer type, which is wound on a core 15 and connected in series with capacitor 3 and anode supply battery 4. The series-booster diode circuit comprising capacitor 3 and diode 6 is connected to a part 16 of the coil 14 at points 17 and 18. A coil 19 of the autotransformer type, to which the deflection coil 9 is connected between points 20 and 21, is wound on a separate part of the core 15.

The upper end 22 of the coil 19 is connected to point 17 of the coil 14 and its lower end 21 is connected to the lower end 18 of coil 14, so that the part 16 of coil 14 and hence the part, to which the series-booster diode circuit is connected, is arranged in parallel with the primary winding 19 of the autotransformer, to which the deflection coil is connected.

For the sake of completeness, it is mentioned that in such a parallel combination of two windings provided on the same core, it is preferable to ensure that the voltages induced in the said windings in the non-parallel connected condition are equal and have the same polarities.

The alternating-current substitution diagram of the circuit of Fig. 3 is shown in Fig. 4.

Here the autotransformers 14 and 19 are represented by inductors 23, 24, 25, 26 and inductors 26, 27, 28, 29, respectively. The inductor 26 represents the common main flux through the core 15 which is comprised by the two transformers. The inductors 25 and 29 represent the direct coupling between the two parts of the winding 14 and the direct coupling between the two parts of the winding 19, respectively. Fig. 4 furthermore indicates values of the inductors as determined in practice.

At the end of the fly-back, energy is available again in the inductor 23, so that an oscillation is again produced in the circuit 23, 24, 6, 13 when the diode 6 becomes conductive. A small part only of the voltage occurring at the junction of the inductors 23 and 24 is set up by way of the inductors 25, 29 across the inductor 27 and this small part of the oscillation amplitude is now the source which still causes interference in the deflection coil 9.

As may be deduced from the numerical values indicated, the amplitude of the interference in the deflection coil 9 has thus become about 73 times smaller.

For the sake of completeness, it is mentioned that auto-transformers are not required when use is made of the invention, but that alternatively transformers having separate primary and secondary windings may be utilised, whilst furthermore in the series-booster diode circuit use may be made of a control-grid tube instead of the diode, as is sometimes the case for linearising purposes.

When the circuit above described is used, the principal source of interfering oscillations occurring in the deflection current is substantially neutralised, since it has been found that the amplitude of the said oscillations is from 50 to 100 times smaller than in the circuits used hitherto. However, it then appears that a second source of interfering oscillations exists which was not noticeable or substantially not noticeable before and which results from the fact that the transformer to which the deflection coil is coupled exhibits stray inductance and natural capacity. This source may also substantially be neutralised, as will be explained with reference to Fig. 5.

Fig. 5 again shows the coil 19 of the circuit of Fig. 2 provided between the points 21 and 22.

Provided between the points 21 and 22 is the deflection coil 9, of which is shown here that it is constituted, apart from its resistance, by the parallel combination of an inductor 30 and a natural capacitor 31.

In the connecting lead between point 20 of coil 19 and the upper end of the deflection coil 9 is also shown the stray inductor 32 of the autotransformer, capacitors 33 and 34 representing the capacities of parts 35 and 36 of the coil 19. If the capacitors 33 and 34 are in inversely proportional relationship to the partial voltages set up across the parts 35 and 36 of coil 19, so that the two parts of this coil exhibit the same capacity, the fact that the capacitor 34 has, in addition, connected in parallel with it the capacitor 31 of coil 9 causes the said relationship to be disturbed, so that upon release of the diode 6 which, as may be seen from Fig. 3, substantially constitutes a short-circuit of the winding 19, the voltage at point 20 is not equal to that at point 37, so that a voltage set up across the stray inductor 32 brings about an oscillation in the deflection current traversing coil 9. Said oscillation may be avoided almost completely by winding the part 36 of coil 19 with smaller capacity than the part 35, so that the resultant relationship between the sum of the capacitors 34, 31 and the capacitor 33 exactly corresponds to the voltage relationship between the parts 36 and 35 of coil 19. It will be evident that the desired relationship may alternatively be obtained by either giving the part 35 a higher capacity or connecting an additional capacitor in parallel therewith.

What is claimed is:

1. A circuit for generating a sawtooth current in a coil comprising an electron discharge device, input and output circuits coupled to said device, a first transformer included in said output circuit, a series-booster diode circuit coupled to a part of said transformer, a second transformer having a primary winding and a secondary winding with the primary winding connected in parallel with said part of said first transformer, said secondary winding being connected to said coil, and a core common to said two transformers, said parallel-connected windings being arranged on separate parts of said core.

2. A circuit, as set forth in claim 1, wherein said second transformer is an autotransformer having said coil connected across one portion thereof, the sum of the capacities of said portion and of said coil and the capacity of the other portion of said autotransformer being in inversely proportional relationship to the voltages occurring across the one portion and the other portion of said autotransformer.

3. A circuit for generating a sawtooth current in a first coil comprising an electron discharge device having a cathode, an anode and a control grid, an input circuit connected between said grid and said cathode, a capacitor, a second coil having a tap thereon connected between said capacitor and said anode, an anode supply source connected between said capacitor and said cathode, a diode having a cathode connected to said tap and an anode connected to the junction of said source and said capacitor, a third coil having a tap thereon connected between the tap of said second coil and the junction of said second coil and said capacitor, and a core common to said second and third coils, said second and third coils enclosing separate parts of said core, said first coil being connected beeween the tap on said third coil and the junction of said second coil and said capacitor.

References Cited in the file of this patent

UNITED STATES PATENTS

| | | |
|---|---|---|
| 2,458,532 | Schlesinger | Jan. 11, 1949 |
| 2,543,305 | Schwarz | Feb. 27, 1951 |
| 2,627,052 | Helpert et al. | Jan. 27, 1953 |
| 2,644,104 | Fyler et al. | June 30, 1953 |
| 2,664,521 | Schlesinger | Dec. 29, 1953 |